Jan. 15, 1952 — M. C. STINSON — 2,582,401
EFFLUENT CLEANER AND SAVER
Filed Dec. 12, 1947 — 2 SHEETS—SHEET 2
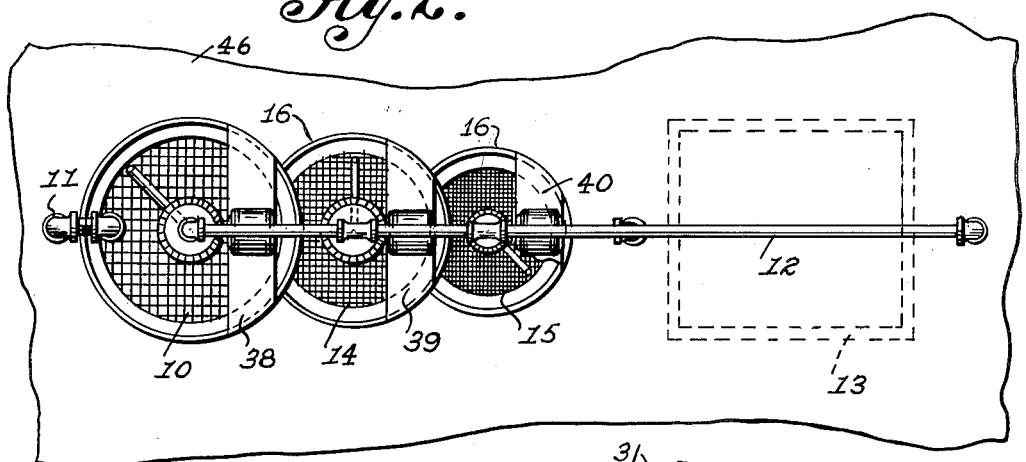
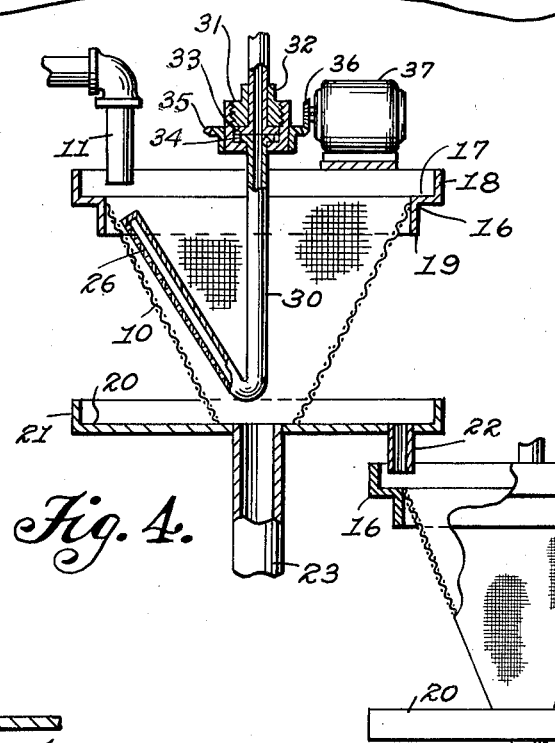
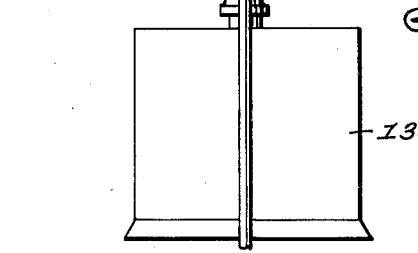
INVENTOR.
Milburn C. Stinson
BY Victor J. Evans & Co.
ATTORNEYS

Patented Jan. 15, 1952

2,582,401

UNITED STATES PATENT OFFICE 2,582,401

EFFLUENT CLEANER AND SAVER

Milburn C. Stinson, Santurce, Puerto Rico

Application December 12, 1947, Serial No. 791,426

1 Claim. (Cl. 210—150)

This invention relates to filtering and cleaning devices of the effluent type and particularly devices adapted for use in cleaning water such as wash water of industrial plants and the like to permit reuse of the water and also to prevent polluting streams, rivers and the like.

The purpose of this invention is to provide a simple and economical device for cleaning water of industrial plants and the like which is adapted for continuous use.

Filtering and cleaning devices for large quantities of water or other fluids occupy comparatively large areas and use sand and gravel in combination with chemicals as filtering agents. These devices are not only costly to install but involve extensive operating facilities and must be cleaned periodically. For this reason they are not generally used by industrial plants and waste or wash water from these plants is discharged into streams and rivers and the streams and rivers are polluted thereby.

With this thought in mind this invention contemplates a unique effluent filtering and cleaning apparatus which arrests foreign matter from fluids passing therethrough and continuously washes the foreign matter arrested therein from the parts thereof.

The object of this invention is, therefore, to provide means for mechanically removing foreign matter from fluids such as waste water of industrial plants which continuously cleans itself as it operates.

Another object of the invention is to provide a filtering device that is adapted for continuous operation.

Another object of the invention is to provide a filtering device comprising a plurality of individual units in which as many units as may be desired may be added to further clean or purify the water.

Another object of the invention is to provide means for cleaning waste or wash water of industrial plants in which foreign matter removed from the water may be recovered.

A further object of the invention is to provide a washing and filtering device for waste water of industrial plants and the like that is adapted for continuous operation, which is of a simple and economical construction.

With these and other objects and advantages in view the invention consists of the new and novel combination, construction, and arrangement of parts, as hereinafter more fully described, set forth in the claim appended hereto, and disclosed in the accompanying drawings, forming part hereof, wherein:

Figure 2 is a plan view of the aparatus with the platform broken away.

Figure 3 is a view showing an end elevation of the apparatus looking toward the supply end and also with a platform on which the apparatus is positioned shown in section.

Figure 4 is a detail on an enlarged scale illustrating the screening or filtering units with parts omitted and parts broken away.

Figure 1:
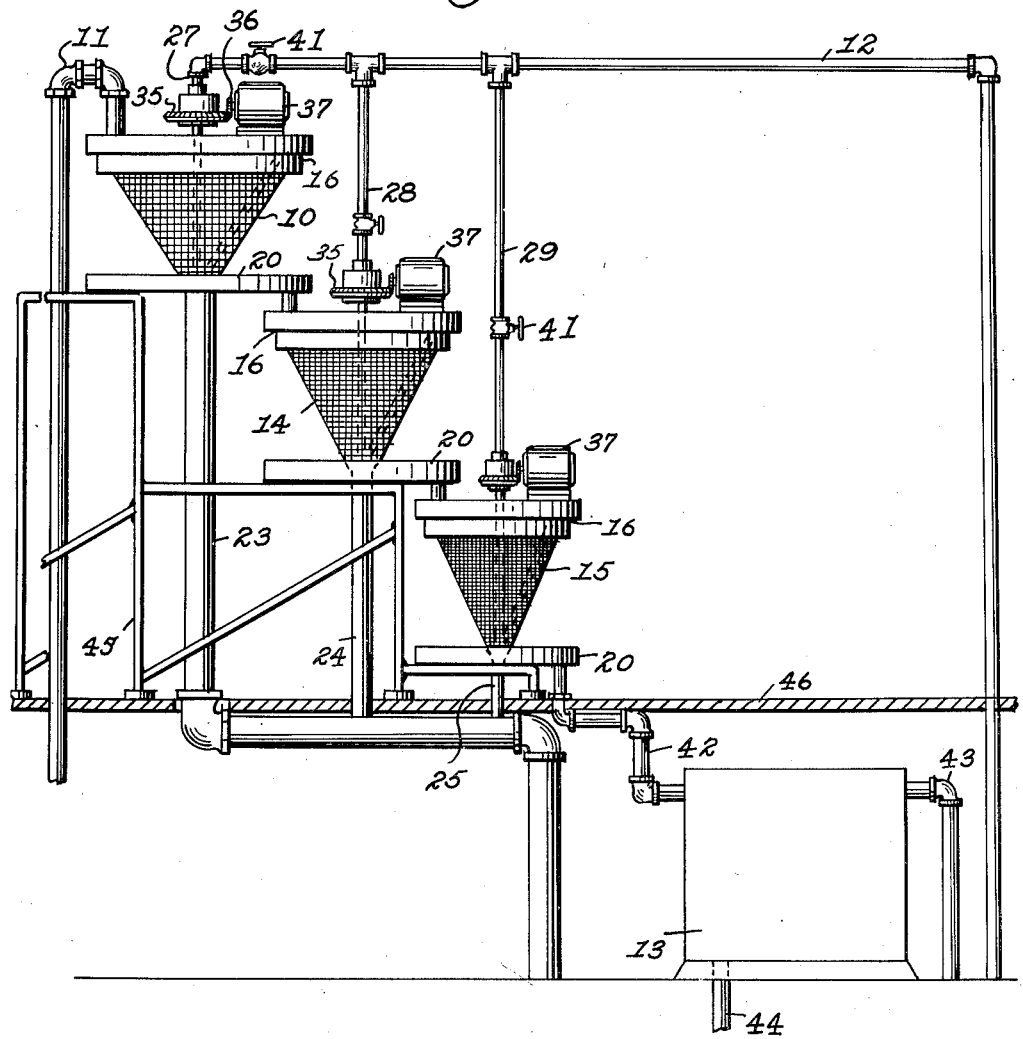
Figure 1 is a view showing a side elevation of the filtering and cleaning apparatus with a platform on which the apparatus is positioned shown in section and with parts broken away.

Referring now to the drawings wherein like reference characters indicate corresponding parts the filtering and screening apparatus of this invention includes cone-shaped elements 10 of wire cloth or mesh, a supply pipe 11, a water spray pipe 12, and a clean water tank 13.

The cone-shaped elements hereinafter referred to as cones are formed of wire cloth or mesh and the upper cone, to which the numeral 10 refers, is made with relatively coarse mesh so that foreign matter of relatively large size will be removed from the fluid thereby, and the next cone 14 is of finer mesh whereas the last cone 15 is of very fine mesh. The size of the mesh may, therefore, be graduated so that foreign matter may be removed from substantially any fluid, and as many cones as may be desired may be used.

The cones are formed with upper Z-shaped rings 16 having horizontally disposed webs 17, with upwardly extending circumferential flanges 18 and depending skirts 19, and the wire mesh is attached to the inner edge of the web 17 as shown in Figure 4. The lower ends of the cones are provided with horizontally disposed trays 20 with peripheral flanges 21, outlet spouts 22, and centrally disposed cleaning spouts 23, 24 and 25. The lower ends of the cones are secured to the trays around the cleaning spouts and foreign matter deposited in the cones is washed down the said cleaning spouts.

Each of the cones is provided with a spray nozzle 26 rotatably mounted on the lower ends of the spray supply pipes 27, 28, and 29, as shown in Figure 4 wherein the nozzle is formed at the lower end of a tube 30 with a hub 31 at the upper end of the tube, and the hubs are threaded on bushings 32 on the spray supply pipes. The lower ends of the pipes are provided with flanges 33 and the upper ends of the tubes 30 are provided with flanges 34 that are held in the hubs. Gears 35 are provided on the hubs 31 that mesh with gears 36 on motors 37 which are mounted on plates 38, 39, and 40, on the rings 16, as shown in Figures 2 and 4, and for usual operation the motors will rotate the nozzles approximately one revolution per minute. The spray supply pipes 27, 28, and 29 are supplied from the pipe 12 and each is provided with a valve 41.

The outlet spout 22 of the tray 20 of the last cone is connected by a pipe 42 to the clean water tank 13, and the tank is provided with an overflow pipe 43 and a drain 44.

The cones are supported from a framework 45 through the trays 20 with the parts mounted on a platform 46, and it will be understood that the parts may be supported in any suitable manner.

With the parts arranged in this manner the waste or return water from an industrial plant or the like is pumped from a sump through the supply pipe 11, which discharges the water into the upper cone 10 and the cleaned water seeps through the cone, dropping into the tray 20, and from the tray it passes through the outlet spout 22 to the next cone. This action is continued through as many cones as may be desired and with the wall of each succeeding cone being of finer mesh and having a steeper slope substantially all foreign matter may be removed from the water.

The foreign matter is deposited upon the inner surfaces of the cones and spray water, which is supplied under pressure, is continuously sprayed against the said inner surfaces so that the foreign matter is washed thereby down the cleaning spouts 23, 24, and 25 continuously. The pipe 23 from the first cone, which receives the bulk of the water is obviously larger than the pipes from the following cones, and as the quantity of water diminishes as it passes through each cone the cleaning spout 25 of the last cone is comparatively small, as shown. This cleaning or refuse line may run to any suitable point or may be connected to a stock line to beaters, or the like.

It will be understood that modifications may be made in the design or arrangement of the parts without departing from the spirit of the invention.

What is claimed is:

In a device for removing foreign matter from liquids, the combination which comprises a plurality of wire mesh cones, the size of the mesh of the said cones decreasing from an upper cone to a lower cone, a frame on which the said cones are mounted in stepped relation, each cone having an annular ring, Z-shaped in cross section carried by the upper edge and positioned with an inner vertical depending flange around the upper edge of the cone and extended downwardly therefrom, a horizontally disposed web extended outwardly from the upper edge of the flange and cone and an outer vertically disposed flange extended upwardly from the peripheral edge of the said horizontally disposed web, each of the said cones also having a horizontally disposed circular plate with an upwardly extended peripheral flange providing a tray extended around the lower end of the cone, said trays having centrally positioned openings therethrough communicating with the interior of the cones and having depending outlet spouts therein spaced inwardly from the peripheral edges and positioned to feed liquid from the trays to succeeding cones at points spaced inwardly from the peripheral edges of the cones, a supply pipe positioned above the upper cone and mounted to feed water containing foreign matter to the upper cone and at a point spaced inwardly from the peripheral edge thereof, outlet pipes extended from the centrally positioned openings of the trays and lower ends of the cones, a V-shape tube having a vertical leg and a perforated upwardly inclined leg positioned in each of said cones, mounting plates positioned on the upper edges of the rings of the cones, motors positioned on said mounting plates and operatively connected to the V-shape tubes for rotating the tubes through the vertical legs thereof and with the perforated legs traveling around the inner surfaces of the cones for washing foreign matter deposited on the inner surfaces of the cones into the pipes extended from the lower ends of the cones and centers of the trays, and supply connections extended from the upper ends of the vertical legs of the V-shaped tubes for supplying clean water to the perforated legs of the V-shaped tubes for washing the inner surfaces of the screen.

MILBURN C. STINSON.

REFERENCES CITED

The following references are of record in the file of this patent:

UNITED STATES PATENTS

| Number | Name | Date |
|---|---|---|
| 700,033 | Glatz | May 13, 1902 |
| 873,390 | Stevenson et al. | Dec. 10, 1907 |
| 1,058,869 | Kier | Apr. 15, 1913 |
| 1,455,911 | Griffin | May 22, 1923 |
| 1,592,149 | Murden | July 13, 1926 |
| 1,611,739 | Hadfield | Dec. 21, 1926 |
| 2,068,837 | Aronson | Jan. 26, 1937 |
| 2,089,702 | Lomax | Aug. 10, 1937 |
| 2,100,482 | Irwine | Nov. 30, 1937 |
| 2,363,188 | McDorman | Nov. 21, 1944 |